(12) United States Patent
Zhou et al.

(10) Patent No.: US 12,445,333 B2
(45) Date of Patent: Oct. 14, 2025

(54) METHOD FOR SYMBOL APPLICATION, COMMUNICATION APPARATUS, AND STORAGE MEDIUM

(71) Applicant: SPREADTRUM COMMUNICATIONS (SHANGHAI) CO., LTD., Shanghai (CN)

(72) Inventors: Huayu Zhou, Shanghai (CN); Mimi Chen, Shanghai (CN); Zhenzhu Lei, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 92 days.

(21) Appl. No.: 18/027,817

(22) PCT Filed: Aug. 25, 2021

(86) PCT No.: PCT/CN2021/114553
§ 371 (c)(1),
(2) Date: Mar. 22, 2023

(87) PCT Pub. No.: WO2022/062819
PCT Pub. Date: Mar. 31, 2022

(65) Prior Publication Data
US 2023/0344688 A1    Oct. 26, 2023

(30) Foreign Application Priority Data
Sep. 22, 2020  (CN) .......... 202011006445.2

(51) Int. Cl.
H04L 27/26    (2006.01)

(52) U.S. Cl.
CPC ...... *H04L 27/2602* (2013.01); *H04L 27/2605* (2013.01)

(58) Field of Classification Search
CPC .......... H04L 27/2602; H04L 27/26025; H04L 27/2605; H04L 27/2607; H04L 27/2613; H04L 27/2636; H04L 27/2646
(Continued)

(56) References Cited

U.S. PATENT DOCUMENTS

| 10,284,407 B2 | 5/2019 | Bala et al. |
| 2013/0054850 A1* | 2/2013 | Co .................. H04L 12/4633 370/465 |

(Continued)

FOREIGN PATENT DOCUMENTS

| CN | 101810025 A | 8/2010 |
| CN | 108028826 A | 5/2018 |

(Continued)

OTHER PUBLICATIONS

Mitsubishi Electric, UW DFTsOFDM performance evaluation above 40GHz, 3GPP TSG-RAN WG1#87, R1-1612378, Nov. 18, 2016.

(Continued)

*Primary Examiner* — Young T. Tse
(74) *Attorney, Agent, or Firm* — HAUPTMAN HAM, LLP

(57) ABSTRACT

A method for symbol application, a communication apparatus, and a storage medium are provided. The method includes: determining a length of a header of a symbol, a length of a data portion of the symbol, and/or a length of a tail of the symbol.

20 Claims, 2 Drawing Sheets

(58) Field of Classification Search
USPC ........ 375/260, 265, 267; 370/208, 210, 278, 370/282, 349, 350
See application file for complete search history.

(56) References Cited

U.S. PATENT DOCUMENTS

| | | | |
|---|---|---|---|
| 2016/0007380 A1* | 1/2016 | Ito | H04W 74/0816 |
| | | | 370/329 |
| 2017/0331639 A1* | 11/2017 | Quan | H04W 72/23 |
| 2018/0316537 A1* | 11/2018 | Haghighat | H04L 27/2636 |
| 2019/0097859 A1 | 3/2019 | Bala et al. | |
| 2020/0068537 A1* | 2/2020 | Oh | H04L 5/0007 |

FOREIGN PATENT DOCUMENTS

| | | |
|---|---|---|
| CN | 108370360 A | 8/2018 |
| CN | 110521257 A | 11/2019 |
| CN | 110913476 A | 3/2020 |
| WO | 2019010808 A1 | 1/2019 |

OTHER PUBLICATIONS

WIPO, International Search Report and Written Opinion for International Application No. PCT/CN2021/114553, Nov. 25, 2021.
The first office action issued in corresponding CN application No. 202011006445.2 dated Jan. 19, 2023.
The extended European search report issued in corresponding EP application No. 21871192.7 dated Feb. 20, 2024.
Notice of allowance issued in corresponding CN application No. 202011006445.2 dated Aug. 31, 2023.

* cited by examiner

METHOD FOR SYMBOL APPLICATION, COMMUNICATION APPARATUS, AND STORAGE MEDIUM

CROSS-REFERENCE TO RELATED APPLICATION(S)

This application is a National Stage of International Application No. PCT/CN2021/114553, field Aug. 25, 2021, which claims priority to Chinese Patent Application No. 202011006445.2, filed Sep. 22, 2020, the disclosures of which are hereby incorporated by reference in their entirety.

TECHNICAL FIELD

The disclosure relates to the field of communication technologies, and more particularly, to a method for symbol application, a communication apparatus, and a storage medium.

BACKGROUND

In the evolution of communication systems, radio waves are well applied for wireless communication technologies at this stage.

At present, in the 5th-generation (5G) new radio (NR) system, there are mainly orthogonal frequency division multiplexing (OFDM) waveforms and discrete Fourier transform spreading OFDM (DFT-S-OFDM) waveforms. For these two waveforms, each symbol includes a cyclic prefix (CP) which can be used to avoid inter-symbol interference (ISI) caused by multipath delay spread. However, the CP always occupies a certain length in the symbol, which will undoubtedly increase the spectrum overhead and limit the spectrum efficiency.

SUMMARY

In a first aspect, implementations of the disclosure provide a method for symbol application. The method includes: determining a length of a header of a symbol, a length of a data portion of the symbol, and/or a length of a tail of the symbol.

In a second aspect, implementations of the disclosure provide a communication apparatus. The apparatus includes a processor, a memory, and a user interface. The processor, the memory, and the user interface are coupled with one another. The memory is configured to store computer programs. The computer programs include program instructions. The processor is configured to invoke the program instructions to perform the method for symbol application as described in the first aspect.

In a third aspect, implementations of the disclosure provide a computer-readable storage medium. The computer-readable storage medium stores one or more instructions. The one or more instructions are configured to be loaded and executed by a processor to perform the method for symbol application as described in the first aspect.

BRIEF DESCRIPTION OF THE DRAWINGS

To describe technical solutions of implementations of the disclosure more clearly, the following briefly introduces the drawings required for the description of implementations. Apparently, the drawings in the following description are some implementations of the disclosure. Those of ordinary skill in the art may also obtain other drawings based on these drawings without creative efforts.

DETAILED DESCRIPTION

Figure 1:
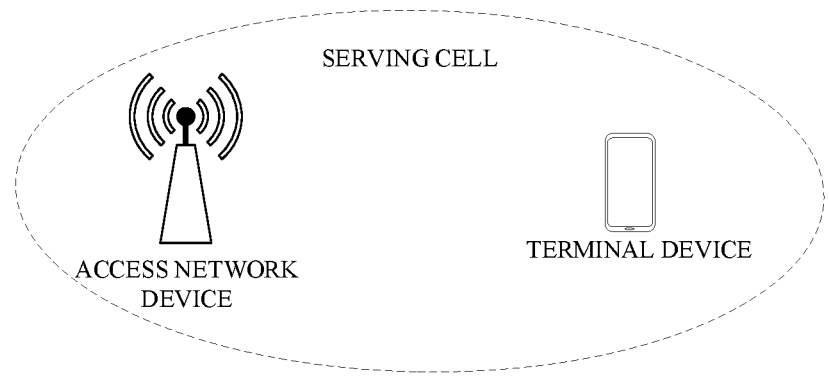
FIG. 1 is a schematic diagram illustrating a network architecture for a method for symbol application provided in implementations of the disclosure.

Reference will now be made in detail to exemplary implementations, examples of which are illustrated in accompanying drawings. When the following description refers to the accompanying drawings, the same numerals in different drawings refer to the same or similar elements unless otherwise indicated. Implementation manners described in following exemplary implementations do not represent all implementations consistent with the disclosure, but rather are merely examples of terminals and methods consistent with aspects of the disclosure as detailed in appended claims.

It should be noted that, in the disclosure, the term "comprising", "including", or any other variation thereof is intended to cover a non-exclusive inclusion such that a process, a method, an object, or an apparatus including a set of elements includes not only those elements, but also other elements not expressly listed or elements inherent in the process, the method, the object, or the apparatus. Without further limitations, an element defined by the phrase "including a . . . " does not exclude the existence of other identical elements in the process, the method, the object, or the apparatus including the element. In addition, components, features, and elements with the same name in different implementations of the disclosure may have the same meaning, or may have different meanings, and their specific meanings need to be determined by their explanations in specific implementations or further combined with the context of the specific implementations.

It should be understood that although the terms "first", "second", "third", and the like may be used herein to describe various information, the information should not be limited to these terms. These terms are only used to distinguish information of the same type from one another. For example, without departing from the scope of the disclosure, the first information may also be referred to as the second information. Similarly, the second information may also be referred to as the first information. Depending on the context, the word "if" as used herein may be interpreted as "when" or "in response to determining that". Furthermore, as used herein, the singular forms "a", "an", and "the" are intended to include the plural forms as well, unless the context indicates otherwise. It should be further understood that the terms "comprising" and "including" indicate the existence of stated features, steps, operations, elements, components, items, species, and/or groups, but do not exclude the existence, occurrence, or addition of one or more other features, steps, operations, elements, components, items, species, and/or groups. The terms "or" and "and/or" as used herein are to be construed as inclusive, or to mean either one or any combination. Thus, "A, B, or C" or "A, B, and/or C" means any of: "A", "B", "C", "A and B", "A and C", "B and C", or "A, B, and C". Exceptions to this definition will only arise when combinations of elements, functions, steps, or operations are inherently mutually exclusive in some way.

It should be understood that although various steps in the flowchart in implementations of the disclosure are displayed sequentially as indicated by arrows, these steps are not necessarily executed sequentially in the order indicated by the arrows. Unless otherwise specified herein, there is no strict order restriction on the execution of these steps, and these steps can be executed in other orders. Moreover, at least some of the steps in the drawings may include multiple sub-steps or stages, these sub-steps or stages are not necessarily executed at the same time, but may be executed at different times, and are not necessarily performed sequentially, but may be performed alternately with at least some of other steps or sub-steps or stages of the steps.

It should be noted that, step numbers such as 210 and 220 are used herein to describe corresponding content more clearly and concisely, and do not constitute a substantive limitation on the order. Those skilled in the art may perform 220 first and then 210 and the like during specific implementation, but all of these shall fall within the scope of the disclosure.

To better understand implementations of the disclosure, technical terms involved in implementations of the disclosure will be introduced below.

Discrete Fourier transform spreading orthogonal frequency division multiplexing (DFT-S-OFDM): a single-carrier modulation scheme, which has a smaller peak-to-average power ratio (PAR) compared with traditional orthogonal frequency division multiplexing (OFDM). DFT-S-OFDM is adopted as an uplink (UL) modulation scheme for long-term evolution (LTE).

Cyclic prefix (CP): a cyclic structure formed by replicating a piece of data following a data symbol to the front of the symbol, so as to ensure that a OFDM signal with a latency aways has an integer number of periods in a fast Fourier transform (FFT) integration period. The CP is formed by replicating the signal at the end of the OFDM symbol to the header. There are mainly two types of CP, i.e., normal CP and extended CP. The length of the normal CP is 4.7 µs, and the length of the extended CP is 16.67 µs. The CP can be correlated with other multipath component information to obtain complete information. In addition, the CP can realize time pre-estimation and frequency synchronization.

Unique word (UW) DFT-S-OFDM: a DFT-S-OFDM without CP, which can reduce the transmitter structure of UW DFT-S-OFDM. Similar to the transmitter structure of DFT-S-OFDM, the transmitter structure of UW DFT-S-OFDM also includes a DFT module, a subcarrier mapping module, and an inverse fast Fourier transform (IFFT) module, but is different from the transmitter structure of DFT-S-OFDM in the following two aspects. 1) In the UW-DFT-S-OFDM transmitter, a predefined sequence is inserted between a header and a tail of the input of the DFT module, that is, the input of the DFT module includes the header, a data portion, and the tail in sequence, which is different from the traditional DFT-S-OFDM transmitter. In the DFT-S-OFDM transmitter, the input of the DFT module only includes the data portion. Since the input of the DFT module includes the header, the data portion, and the tail in sequence, a symbol also includes the header, the data portion, and the tail in sequence in the time domain. 2) There is no CP in the UW DFT-S-OFDM waveform. Therefore, the UW DFT-S-OFDM waveform usually includes more symbols in one slot or time interval than the DFT-S-OFDM waveform. For example, for the DFT-S-OFDM waveform, there are 14 symbols in one slot or time interval, and for the UW DFT-S-OFDM waveform, there are 15 symbols in one slot or time interval. In the UW DFT-S-OFDM waveform, there is usually one symbol (referred to as reference signal symbol herein) dedicated to a reference signal (RS) or a pilot and used for the receiver to perform channel estimation in the frequency domain and estimate a channel response in the frequency domain. For a reference signal symbol, the data portion is also a predefined sequence which forms a long predefined sequence with predefined sequences of the header and the tail. For other symbols other than the reference signal symbol, predefined sequences of the header and the tail of the symbol are also parts of a long predefined sequence. For each symbol, the header and the tail may be different and configurable. The header of each symbol can be used to reduce inter-symbol interference (ISI). For other symbols other than the reference signal symbol, the tail can be used to update a channel estimation value and estimate a change of the channel response caused by time variation.

Zero tail (ZT) DFT-S-OFDM: another DFT-S-OFDM without CP, which can be considered as a variant of the UW DFT-S-OFDM. In the ZT DFT-S-OFDM transmitter, the header and the tail of the input of the DFT module are sequences of zeros. The ZT DFT-S-OFDM is equivalent to a special form of the UW DFT-S-OFDM.

Radio resource control (RRC): also referred to as radio resource management (RRM), or radio resource allocation (RRA), which refers to the management, control, and scheduling of wireless resources with certain strategies and means, to make full use of limited wireless network resources under the requirement of meeting the quality of service, thereby ensuring to reach a planned coverage and improving the business capacity and the resource utilization rate.

To better understand implementations of the disclosure, a network architecture applicable in implementations of the disclosure will be described below.

Referring to FIG. 1, FIG. 1 is a schematic diagram illustrating a network architecture for a method for symbol application provided in implementations of the disclosure. As illustrated in FIG. 1, the network architecture may include an access network device and a terminal device. The terminal device establishes a connection with the access network device via a serving cell. There may be one or more channels, such as a physical downlink control channel (PDCCH), a physical downlink shared channel (PDSCH), a physical uplink shared channel (PUSCH), and the like in the serving cell to function as a data transmission medium between the access network device and the terminal device.

The access network device involved in implementations of the disclosure is a network-side entity configured to transmit or receive signals. The access network device may be configured to convert a received air frame to an internet protocol (IP) packet and vice versa, or function as a router between the terminal device and the rest of the access network, where the rest of the access network may include an IP network, etc. The access network device can also coordinate attribute management for air interfaces. For example, the access network device may be an eNB in LTE, a new radio (NR) controller, a gNB in a 5th-generation (5G) system, a centralized unit, an NR base station, a radio remote module, a micro base station, a relay, a distributed unit, a transmission reception point (TRP), a transmission point (TP), or any other radio access device, which is not limited herein.

The terminal device involved in implementations of the disclosure is a user-side entity configured to receive or transmit signals. The terminal device may be a device that provides voice and/or data connectivity to a user, for example, a handheld device, a vehicle-mounted device, and the like with a wireless connection function. The terminal device may also be other processing devices connected to a wireless modem. The terminal device can communicate with a radio access network (RAN). The terminal device may also be referred to as a wireless terminal, a subscriber unit, a subscriber station, a mobile station, a mobile, a remote station, an access point, a remote terminal, an access terminal, a user terminal, a user agent, a user device, or user equipment (UE), etc. The terminal device may be a mobile terminal, such as a mobile phone (or referred to as a "cellular" phone) or a computer equipped with a mobile terminal, such as portable, pocket, hand-held, built-in computer, or vehicle-mounted mobile apparatuses, which exchange language and/or data with RANs. For example, the terminal device may also be a personal communication service (PCS) phone, a cordless phone, a session initiation protocol (SIP) phone, a wireless local loop (WLL) station, a personal digital assistant (PDA), etc. Common terminal devices include, for example, mobile phones, tablet computers, notebook computers, handheld computers, mobile Internet devices (MID), vehicles, roadside devices, aircrafts, wearable devices, such as smart watches, smart bracelets, and pedometers, etc., which is not limited herein. Communication methods and related devices provided in the disclosure are introduced in detail below.

In the current technology, the DFT-S-OFDM can use a CP to prevent ISI that may occur due to channel delay spread and timing synchronization errors. However, since the CP is configured for each cell, if an extended CP is configured, the system may lose some spectrum efficiency. At present, a UW DFT-S-OFDM symbol and a ZT DFT-S-OFDM symbol do not has a CP. Therefore, the spectrum efficiency can be potentially improved by using these two symbols. Generally, the UW DFT-S-OFDM and the ZT DFT-S-OFDM may introduce additional overhead, such as a header or a tail. A method for flexibly configuring or indicating additional overhead is adopted in the disclosure to ensure the spectrum efficiency and improve the system flexibility.

To optimize the method for symbol application to be applicable to various scenarios, a method for symbol application and a communication apparatus are provided in implementations of the disclosure and are further introduced in detail below.

Implementations of the disclosure provides a method for symbol application. The method may include the following.

110. Determine a length of a header of a symbol, a length of a data portion of the symbol, and/or a length of a tail of the symbol.

After receiving a symbol from an access network device, a terminal device may determine the length of the header of the symbol, the length of the data portion of the symbol, and/or the length of the tail of the symbol. The terminal device may obtain a signaling related to the symbol, and determine the length of the header of the symbol, the length of the data portion of the symbol, and/or the length of the tail of the symbol according to the signaling. Alternatively, the terminal may obtain a type of the symbol, and determine the length of the header of the symbol, the length of the data portion of the symbol, and/or the length of the tail of the symbol according to the type of the symbol. In this way, according to the length of the header of the symbol, the length of the data portion of the symbol, and/or the length of the tail of the symbol obtained, the terminal device can make flexible configuration, and the length information can be used for other different purposes.

According to implementations of the disclosure, the terminal device can more flexibly obtain the length of the header of the symbol, the length of the data portion of the symbol, and/or the length of the tail of the symbol, and can also flexibly use the obtained lengths of respective portions, so that the application of waveforms and symbols is applicable to various scenarios.

Figure 2:
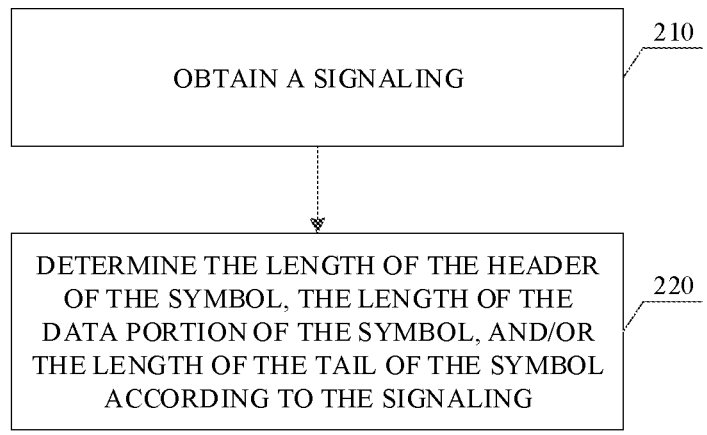
FIG. 2 is a schematic diagram illustrating a process of determining a length according to a signaling provided in implementations of the disclosure.

Referring to FIG. 2, FIG. 2 is a schematic diagram illustrating a process of determining a length according to a signaling provided in implementations of the disclosure. The process illustrated in FIG. 2 may include the following.

210. Obtain a signaling.

The terminal device can receive the signaling from the access network device via a channel established with the access network device. Before obtaining the signaling, the terminal device may establish an RRC connection with the access network device selected, and perform transmission of traffics such as signalings and data via the established RRC connection.

In possible implementations, the signaling may be contained in an RRC signaling. The RRC signaling may include an RRC connection request signaling, an RRC connection reconfiguration signaling, an RRC connection setup complete signaling, or other signalings. A certain kind of RRC signaling may be the target signaling in implementations of the disclosure. By obtaining the signaling, the terminal device may obtain required information for use in subsequent steps. If the signaling is contained in the RRC signaling, the length information may be indicated by a semi-static signaling and contain the length of the header of the symbol, the length of the data portion of the symbol, and/or the length of the tail of the symbol. The RRC signaling may also be referred to as a semi-static signaling.

In possible implementations, the signaling may be contained in a medium access control (MAC) signaling, a MAC packet data unit (PDU), or a MAC control element (CE). The MAC signaling may be transmitted by the access network device via an established RRC connection and a selected channel. The MAC PDU is a PDU in the MAC layer, which consists of strings arranged in bytes (8 bits). The access network device transmits the MAC PDU to the terminal device via the established RRC connection and the selected channel. One MAC PDU may consist of one MAC header, 0 or more MAC SDUs, 0 or more MAC CEs, and a possible padding. That is, the signaling may be contained in the MAC PDU or the MAC CE in the MAC PDU. If the signaling is contained in the MAC signaling, the MAC PDU, or the MAC CE, the length information can be indicated by a semi-persistent signaling.

In possible implementations, the signaling may be contained in a PDCCH, downlink control information (DCI), or a slot format indicator (SFI). The DCI may be scheduling information. The access network device may transmit the DCI to the terminal device via the PDCCH, and the signaling may be contained in the DCI. If the signaling is contained in the DCI or the SFI, the length information can be indicated by a dynamic signaling.

220. Determine the length of the header of the symbol, the length of the data portion of the symbol, and/or the length of the tail of the symbol according to the signaling.

After obtaining the signaling, the terminal device may obtain the length of the header of the symbol, the length of the data portion of the symbol, and/or the length of the tail of the symbol from the signaling. The terminal device may also receive the symbol transmitted by the access network device on a certain time-frequency resource in advance. After obtaining the length information, the terminal device can make flexible configuration, and the length information can be used for other different purposes. For example, if the length of the header of the symbol, the length of the data portion of the symbol, and/or the length of the tail of the symbol are obtained, some blank positions can be left in the header of the symbol for use by symbols of other waveforms, which is beneficial to the mixed use of different waveforms, thereby improving the flexibility of the terminal device in processing waveforms and symbols corresponding to the waveforms.

In possible implementations, the symbol may have a UW DFT-S-OFDM waveform or a ZT DFT-S-OFDM waveform.

In possible implementations, since the total length of the symbol is fixed, after obtaining the lengths of any two of the header, the data portion, and the tail, the terminal device can obtain the length of each of the three portions. In this way, the base station does not need to configure a corresponding signaling for the length of each of these three portions, thereby saving the signaling overhead.

In possible implementations, the terminal device determines the length of the header of the symbol, the length of the data portion of the symbol, and/or the length of the tail of the symbol according to a predefined length set, where one element in the predefined length set indicates the length of the header of the symbol, the length of the data portion of the symbol, and/or the length of the tail of the symbol. In this way, the base station only needs to indicate the index of the element, thereby saving the signaling overhead.

In possible implementations, the predefined length set may be a predefined length table, and one row or one column in the predefined length table may indicate the length of the header of the symbol, the length of the data portion of the symbol, and/or the length of the tail of the symbol. It should be noted that, the terminal device may receive multiple symbols, each symbol may correspond to one index, and one row or one column in the predefined length table may include one index and length information. To determine the length of the header of the symbol, the length of the data portion of the symbol, and/or the length of the tail of the symbol, the terminal device only needs to obtain the index of the symbol. The index may be indicated by the signaling mentioned above. One signaling may indicate an index of a row or a column in the predefined length table.

In possible implementations, the length of the header of the symbol of a first type, the length of the data portion of the symbol of the first type, and/or the length of the tail of the symbol of the first type may be predefined. In this way, there is no need for a signaling to indicate the length information of the symbol of the first type. The symbol of the first type can be used to carry information on initial access or cell search, so that the terminal device can use the symbol of this type to quickly access the network without an indication. The symbol of the first type generally refers to one kind of symbol, and the length of the header of the symbol of the first type, the length of the data portion of the symbol of the first type, and/or the length of the tail of the symbol of the first type can be configured by the terminal device or the access network device.

In possible implementations, the length of the header of the symbol of a second type, the length of the data portion of the symbol of the second type, and/or the length of the tail of the symbol of the second type are indicated by an RRC signaling. Generally, the terminal device determines the length of the header of the symbol of the second type, the length of the data portion of the symbol of the second type, and/or the length of the tail of the symbol of the second type simply through the RRC signaling. The symbol of the second type can be used to carry broadcast information, such as system information, so that terminal device can use such symbols to transmit and receive data even in the idle state. The symbol of the second type can also be used to carry periodic information, so that the terminal device can periodically use this type of symbol to transmit and receive data in the connected state.

In possible implementations, the length of the header of the symbol of a third type, the length of the data portion of the symbol of the third type, and/or the length of the tail of the symbol of the third type are indicated by a MAC signaling, a MAC PDU, or a MAC CE. Generally, the terminal device determines the length of the header of the symbol of the third type, the length of the data portion of the symbol of the third type, and/or the length of the tail of the symbol of the third type simply through the MAC signaling, the MAC PDU, or the MAC CE. The symbol of the third type is used to carry semi-persistent information, so that the terminal device can continuously use this type of symbol to transmit and receive data in a period of time.

In possible implementations, the length of the header of the symbol of a fourth type, the length of the data portion of the symbol of the fourth type, and/or the length of the tail of the symbol of the fourth type are indicated by a PDCCH, a DCI, or an SFI configuration. The terminal device may determine the length of the header of the symbol of the fourth type, the length of the data portion of the symbol of the fourth type, and/or the length of the tail of the symbol of the fourth type through the PDCCH, the DCI, or the SFI configuration. The symbol of the fourth type is used to carry dynamic information, so that the terminal device can use this type of symbol to transmit and receive data in a short period of time. The DCI may be a common DCI. The PDCCH may be a group common (GC) PDCCH.

According to implementations of the disclosure, the terminal device can obtain the signaling, and determine the length of the header of the symbol, the length of the data portion of the symbol, and/or the length of the tail of the symbol according to the signaling for various purposes. The signaling may be contained in the RRC signaling, the MAC signaling, the MAC PDU, the MAC CE, the DCI, the SFI, etc., so that the terminal device has more options when determining the length of each portion of the symbol.

Figure 3:
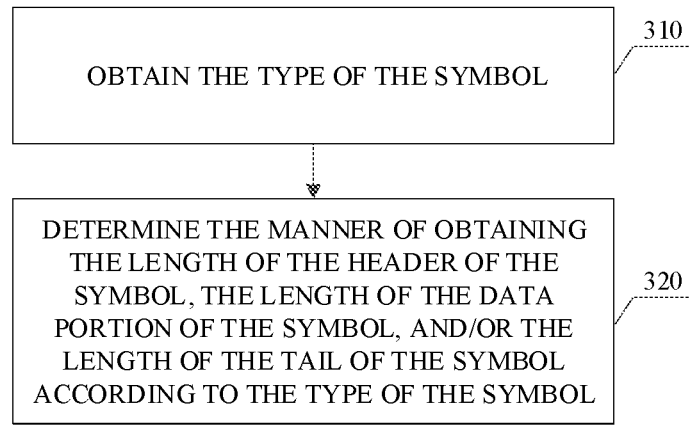
FIG. 3 is a schematic diagram illustrating a process of determining a length according to the type of a symbol provided in implementations of the disclosure.

Referring to FIG. 3, FIG. 3 is a schematic diagram illustrating a process of determining a manner of obtaining a length according to the type of a symbol provided in implementations of the disclosure. The process illustrated in FIG. 3 may include the following.

310. Obtain the type of the symbol.

After receiving the symbol from the access network device, the terminal device can obtain the type of the symbol. The type of the symbol can be indicated by a signaling.

320. Determine the manner of obtaining the length of the header of the symbol, the length of the data portion of the symbol, and/or the length of the tail of the symbol according to the type of the symbol.

After obtaining the signaling and obtaining the type of the symbol according to the signaling, the terminal device can determine the manner of obtaining the length of the header of the symbol, the length of the data portion of the symbol, and/or the length of the tail of the symbol.

In possible implementations, the length of the header of the symbol of a first type, the length of the data portion of the symbol of the first type, and/or the length of the tail of the symbol of the first type may be predefined. In this way, there is no need for a signaling to indicate the length information of the symbol of the first type. The symbol of the first type can be used to carry information on initial access or cell search, so that the terminal device can use the symbol of this type to quickly access the network without an indication.

In possible implementations, the length of the header of the symbol of a second type, the length of the data portion of the symbol of the second type, and/or the length of the tail of the symbol of the second type are obtained from an RRC signaling. Generally, the terminal device determines the length of the header of the symbol of the second type, the length of the data portion of the symbol of the second type, and/or the length of the tail of the symbol of the second type simply through the RRC signaling. That is, the length of the header of the symbol of the second type, the length of the data portion of the symbol of the second type, and/or the length of the tail of the symbol of the second type can be modified by the RRC signaling. The symbol of the second type can be used to carry broadcast information, such as system information, so that terminal device can use such symbols to transmit and receive data even in the idle state. The symbol of the second type can also be used to carry periodic information, so that the terminal device can periodically use this type of symbol to transmit and receive data in the connected state.

In possible implementations, the length of the header of the symbol of a third type, the length of the data portion of the symbol of the third type, and/or the length of the tail of the symbol of the third type are obtained from a MAC signaling, a MAC PDU, or a MAC CE. Generally, the terminal device determines the length of the header of the symbol of the third type, the length of the data portion of the symbol of the third type, and/or the length of the tail of the symbol of the third type simply through the MAC signaling, the MAC PDU, or the MAC CE. That is, the length of the header of the symbol of the third type, the length of the data portion of the symbol of the third type, and/or the length of the tail of the symbol of the third type can be modified by the MAC signaling, the MAC PDU, or the MAC CE. The symbol of the third type is used to carry semi-persistent information, so that the terminal device can continuously use this type of symbol to transmit and receive data in a period of time.

In possible implementations, the length of the header of the symbol of a fourth type, the length of the data portion of the symbol of the fourth type, and/or the length of the tail of the symbol of the fourth type are obtained from a PDCCH, a DCI, or an SFI configuration. The terminal device may determine the length of the header of the symbol of the fourth type, the length of the data portion of the symbol of the fourth type, and/or the length of the tail of the symbol of the fourth type through the PDCCH, the DCI, or the SFI configuration. That is, the length of the header of the symbol of the fourth type, the length of the data portion of the symbol of the fourth type, and/or the length of the tail of the symbol of the fourth type can be modified by the PDCCH, the DCI, or the SFI configuration. The symbol of the fourth type is used to carry dynamic information, so that the terminal device can use this type of symbol to transmit and receive data in a short period of time. The DCI may be a common DCI. The PDCCH may be a group common (GC) PDCCH.

According to implementations of the disclosure, the terminal device can determine the manner of obtaining the length of the header of the symbol, the length of the data portion of the symbol, and/or the length of the tail of the symbol according to the type of the symbol. Lengths of symbols of different types can be determined in different manners, thereby improving the system flexibility.

Figure 4:
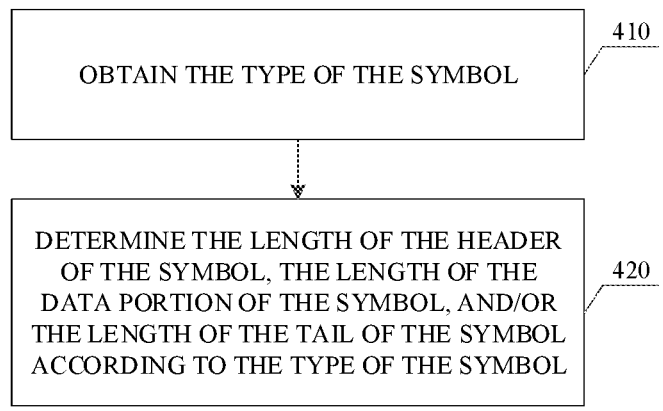
FIG. 4 is a schematic diagram illustrating another process of determining a length according to the type of a symbol provided in implementations of the disclosure.

Referring to FIG. 4, FIG. 4 is a schematic diagram illustrating another process of determining a manner of obtaining a length according to the type of a symbol provided in implementations of the disclosure. The process illustrated in FIG. 4 may include the following.

410. Obtain the type of the symbol.

After receiving the symbol from the access network device, the terminal device can obtain the type of the symbol. The type of the symbol can be indicated by a signaling. The type of the symbol may be associated with the length of the header of the symbol, the length of the data portion of the symbol, and/or the length of the tail of the symbol. The type of the symbol can be obtained from an RRC signaling. The type of the symbol can also be obtained from a MAC signaling, a MAC PDU, or a MAC CE. The type of the symbol can also be obtained from a PDCCH, a DCI, or an SFI configuration. The association can be obtained from a signaling. The association can be obtained from an RRC signaling. The association can also be obtained from a MAC signaling, a MAC PDU, or a MAC CE. The association can also be obtained from a PDCCH, a DCI, or an SFI configuration.

420. Determine the length of the header of the symbol, the length of the data portion of the symbol, and/or the length of the tail of the symbol according to the type of the symbol.

The terminal device can obtain the type of the symbol, and determine the length of each portion of the symbol according to the association between the type of the symbol and the length of the portion of the symbol. The association between the type of the symbol and the length of each portion of the is obtained from a signaling. For example, a type of symbol is defined for carrying a reference signal or for channel estimation, and the header of this type of symbol is long and can carry a long reference signal sequence.

According to implementations of the disclosure, the terminal device can determine the length of the header of the symbol, the length of the data portion of the symbol, and/or the length of the tail of the symbol according to the type of the symbol, thereby reducing the signaling overhead.

Figure 5:
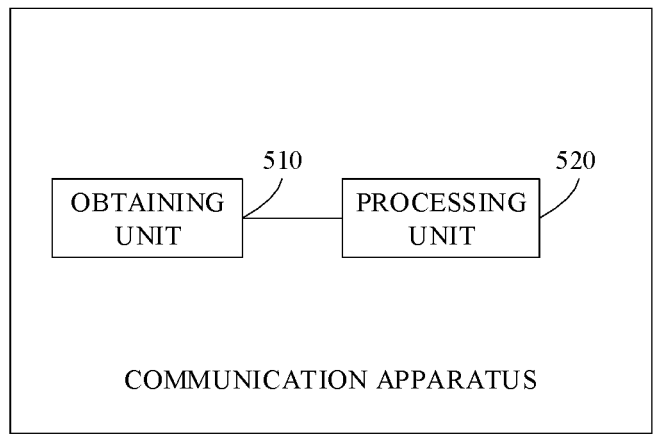
FIG. 5 is a schematic diagram illustrating units of a communication apparatus provided in implementations of the disclosure.

Referring to FIG. 5, FIG. 5 is a schematic diagram illustrating units of a communication apparatus provided in implementations of the disclosure. The communication apparatus illustrated in FIG. 5 may be configured to perform some or all functions of the terminal device in foregoing method implementations illustrated in FIGS. 2, 3, and 4. The apparatus may be a terminal device, an apparatus in the terminal device, or an apparatus that can be used with the terminal device. The logical structure of the apparatus may include an obtaining unit 510 and a processing unit 520. The obtaining unit 510 is configured to obtain a signaling. The processing unit 520 is configured to determine the length of the header of the symbol, the length of the data portion of the symbol, and/or the length of the tail of the symbol according to the signaling.

In possible implementations, the symbol has a UW DFT-S-OFDM waveform or a ZT DFT-S-OFDM waveform.

In possible implementations, the length of the header of the symbol, the length of the data portion of the symbol, and/or the length of the tail of the symbol are determined according to a predefined length set. The signaling indicates one element in the predefined length set.

In possible implementations, the predefined length set is a predefined length table, and one row or one column in the predefined length table indicates the length of the header of the symbol, the length of the data portion of the symbol, and/or the length of the tail of the symbol.

In possible implementations, the predefined length set is configured by an RRC signaling.

In possible implementations, the signaling is contained in an RRC signaling.

In possible implementations, the signaling is contained in a MAC signaling, a MAC PDU, or a MAC CE.

In possible implementations, the signaling is contained in a PDCCH, a DCI, or an SFI.

In possible implementations, the signaling indicates a type of the symbol.

In possible implementations, a manner of obtaining the length of the header of the symbol, the length of the data portion of the symbol, and/or the length of the tail of the symbol is determined according to a type of the symbol.

In possible implementations, the length of the header of the symbol of a first type, the length of the data portion of the symbol of the first type, and/or the length of the tail of the symbol of the first type are predefined.

In possible implementations, the length of the header of the symbol of a second type, the length of the data portion of the symbol of the second type, and/or the length of the tail of the symbol of the second type are obtained from an RRC signaling.

In possible implementations, the length of the header of the symbol of a third type, the length of the data portion of the symbol of the third type, and/or the length of the tail of the symbol of the third type are obtained from a MAC signaling, a MAC PDU, or a MAC CE.

In possible implementations, the length of the header of the symbol of a fourth type, the length of the data portion of the symbol of the fourth type, and/or the length of the tail of the symbol of the fourth type are obtained from a PDCCH, a DCI, or an SFI.

In possible implementations, the processing unit 520 is further configured to determine the length of the header of the symbol, the length of the data portion of the symbol, and/or the length of the tail of the symbol according to a type of the symbol.

According to implementations of the disclosure, the terminal device can obtain the signaling, and determine the length of the header of the symbol, the length of the data portion of the symbol, and/or the length of the tail of the symbol according to the signaling for various purposes. The signaling may be contained in the RRC signaling, the MAC signaling, the MAC PDU, the MAC CE, the DCI, the SFI, etc., so that the terminal device has more options when determining the length of each portion of the symbol. In addition, the terminal device may also obtain the type of the symbol from the signaling, and obtain the association between the type of the symbol and the length of each portion of the symbol from the signaling to determine the length of each portion of the symbol. In this way, the signaling overhead can be reduced. With this method, the terminal device can more flexibly obtain the length of the header of the symbol, the length of the data portion of the symbol, and/or the length of the tail of the symbol, and can also flexibly use the obtained lengths of respective portions, so that the application of waveforms and symbols is applicable to various scenarios.

Figure 6:
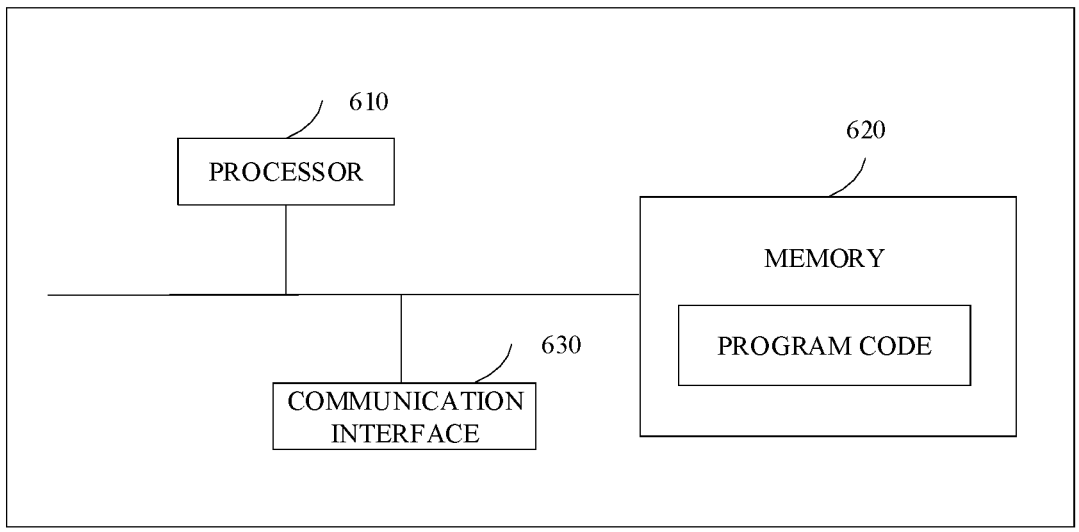
FIG. 6 is a simplified schematic diagram illustrating a physical structure of a communication apparatus provided in implementations of the disclosure.

Referring to FIG. 6, FIG. 6 is a simplified schematic diagram illustrating a physical structure of a communication apparatus provided in implementations of the disclosure. The apparatus includes a processor 610, a memory 620, and a communication interface 630. The processor 610, the memory 620, and the communication interface 630 are connected via one or more communication buses.

The processor 610 is configured to support the communication apparatus to execute corresponding functions in the methods in FIGS. 2, 3, and 4. The processor 610 may be a central processing unit (CPU), a network processor (NP), a hardware chip, or any combination thereof.

The memory 620 is configured to store program codes and the like. The memory 620 may include a volatile memory, such as a random access memory (RAM). The memory 620 may also include a non-volatile memory, such as a read-only memory (ROM), a flash memory, a hard disk drive (HDD), or a solid-state drive (SSD), or may include a combination of thereof.

The communication interface 630 is configured to transmit and receive data, information, or messages, and may also be referred to as a transceiver, a transceiver circuit, and the like. For example, the communication interface 630 is configured for the terminal device to receive at least one DCI or a symbol transmitted by the access network device.

In implementations of the disclosure, when the communication apparatus is applied to the terminal device, the processor 610 can invoke the program codes stored in the memory 620 to invoke the communication interface 630 to obtain a signaling. The processor 610 invokes the program codes stored in the memory 620 to determine the length of the header of the symbol, the length of the data portion of the symbol, and/or the length of the tail of the symbol.

In possible implementations, the symbol has a UW DFT-S-OFDM waveform or a ZT DFT-S-OFDM waveform.

In possible implementations, the length of the header of the symbol, the length of the data portion of the symbol, and/or the length of the tail of the symbol are determined according to a predefined length set. The signaling indicates one element in the predefined length set.

In possible implementations, the predefined length set is a predefined length table, and one row or one column in the predefined length table indicates the length of the header of the symbol, the length of the data portion of the symbol, and/or the length of the tail of the symbol.

In possible implementations, the predefined length set is configured by an RRC signaling.

In possible implementations, the signaling is contained in an RRC signaling.

In possible implementations, the signaling is contained in a MAC signaling, a MAC PDU, or a MAC CE.

In possible implementations, the signaling is contained in a PDCCH, a DCI, or an SFI.

In possible implementations, the signaling indicates a type of the symbol.

In possible implementations, a manner of obtaining the length of the header of the symbol, the length of the data portion of the symbol, and/or the length of the tail of the symbol is determined according to a type of the symbol.

In possible implementations, the length of the header of the symbol of a first type, the length of the data portion of the symbol of the first type, and/or the length of the tail of the symbol of the first type are predefined.

In possible implementations, the length of the header of the symbol of a second type, the length of the data portion of the symbol of the second type, and/or the length of the tail of the symbol of the second type are obtained from an RRC signaling.

In possible implementations, the length of the header of the symbol of a third type, the length of the data portion of the symbol of the third type, and/or the length of the tail of the symbol of the third type are obtained from a MAC signaling, a MAC PDU, or a MAC CE.

In possible implementations, the length of the header of the symbol of a fourth type, the length of the data portion of the symbol of the fourth type, and/or the length of the tail of the symbol of the fourth type are obtained from a PDCCH, a DCI, or an SFI.

In possible implementations, the processor 610 invokes the program codes stored in the memory 620 to determine the length of the header of the symbol, the length of the data portion of the symbol, and/or the length of the tail of the symbol according to a type of the symbol.

According to implementations of the disclosure, the terminal device can obtain the signaling, and determine the length of the header of the symbol, the length of the data portion of the symbol, and/or the length of the tail of the symbol according to the signaling for various purposes. The signaling may be contained in the RRC signaling, the MAC signaling, the MAC PDU, the MAC CE, the DCI, the SFI, etc., so that the terminal device has more options when determining the length of each portion of the symbol. In addition, the terminal device may also obtain the type of the symbol from the signaling, and obtain the association between the type of the symbol and the length of each portion of the symbol from the signaling to determine the length of each portion of the symbol. In this way, the signaling overhead can be reduced. With this method, the terminal device can more flexibly obtain the length of the header of the symbol, the length of the data portion of the symbol, and/or the length of the tail of the symbol, and can also flexibly use the obtained lengths of respective portions, so that the application of waveforms and symbols is applicable to various scenarios.

It should be noted that, in foregoing implementations, descriptions of respective implementations have their own emphases, and for parts not described in detail in a certain implementation, reference may be made to relevant descriptions of other implementations.

The steps in methods in implementations of the disclosure can be adjusted, combined, and deleted according to actual needs.

The units in processing devices in implementations of the disclosure can be combined, divided, and deleted according to actual needs.

The functions in implementations described above may be implemented in whole or in part through software, hardware, firmware, or any combination thereof. When implemented through software, the functions may be implemented in whole or in part in a form of a computer program product. The computer program product includes one or more computer instructions. When the computer program instructions are loaded and executed on a computer, processes or functions are generated in whole or in part according to implementations of the disclosure. The computer may be a general-purpose computer, a special purpose computer, a computer network, or another programmable apparatus. The computer instructions may be stored in a computer-readable storage medium, or may be transmitted from one computer-readable storage medium to another computer-readable storage medium. For example, the computer instructions may be transmitted from a website site, a computer, a server, or a data center to another website site, computer, server, or data center through a wired mode (e.g., a coaxial cable, an optical fiber, and a digital subscriber line (DSL)) or a wireless mode (e.g., infrared radiation, radio, and microwave.). The computer-readable storage medium may be any available medium which a computer may access to, or a data storage device such as a server or data center that includes one or more available media integrated therein. The available medium may be a magnetic medium (e.g., a floppy disk, a memory disk, and a magnetic tape), an optical medium (e.g., a digital video disc (DVD)), or a semiconductor medium (e.g., a solid state disk (SSD)), or the like.

Finally, it should be noted that above implementations are only for illustration of the technical solutions of the disclosure rather than limitation. Although the disclosure has been described in detail with reference to foregoing implementations, those of ordinary skill in the art should understand that it is still possible to modify the technical solutions described in foregoing implementations or perform equivalent replacements for some or all of the technical features. These modifications or replacements do not make the essence of the technical solutions depart from the scope of the technical solutions of various implementations of the disclosure.

A method for symbol application and a communication apparatus are disclosed in the disclosure, with which the method for symbol application can be optimized to be applicable to various scenarios.

In a first aspect, implementations of the disclosure provide a method for symbol application. The method includes: determining a length of a header of a symbol, a length of a data portion of the symbol, and/or a length of a tail of the symbol.

In implementations, obtain a signaling, and determine the length of the header of the symbol, the length of the data portion of the symbol, and/or the length of the tail of the symbol according to the signaling.

In implementations, the symbol has a unique word (UW) discrete Fourier transform spreading orthogonal frequency division multiplexing (DFT-S-OFDM) waveform or a zero tail (ZT) DFT-S-OFDM waveform.

In implementations, determine the length of the header of the symbol, the length of the data portion of the symbol, and/or the length of the tail of the symbol according to a predefined length set, where one element in the predefined length set indicates the length of the header of the symbol, the length of the data portion of the symbol, and/or the length of the tail of the symbol.

In implementations, the predefined length set is a predefined length table, and one row or one column in the predefined length table indicates the length of the header of the symbol, the length of the data portion of the symbol, and/or the length of the tail of the symbol.

In implementations, the predefined length set is configured by a radio resource control (RRC) signaling.

In implementations, the signaling is contained in an RRC signaling.

In implementations, the signaling is contained in a medium access control (MAC) signaling, a MAC packet data unit (PDU), or a MAC control element (CE).

In implementations, the signaling is contained in a physical downlink control channel (PDCCH), downlink control information (DCI), or a slot format indicator (SFI).

In implementations, determine a manner of obtaining the length of the header of the symbol, the length of the data portion of the symbol, and/or the length of the tail of the symbol according to a type of the symbol.

In implementations, the length of the header of the symbol of a first type, the length of the data portion of the symbol of the first type, and/or the length of the tail of the symbol of the first type are predefined.

In implementations, the length of the header of the symbol of a second type, the length of the data portion of the symbol of the second type, and/or the length of the tail of the symbol of the second type are obtained from an RRC signaling.

In implementations, the length of the header of the symbol of a third type, the length of the data portion of the symbol of the third type, and/or the length of the tail of the symbol of the third type are obtained from a MAC signaling, a MAC PDU, or a MAC CE.

In implementations, the length of the header of the symbol of a fourth type, the length of the data portion of the symbol of the fourth type, and/or the length of the tail of the symbol of the fourth type are obtained from a PDCCH, a DCI, or an SFI.

In implementations, determine the length of the header of the symbol, the length of the data portion of the symbol, and/or the length of the tail of the symbol according to a type of the symbol.

In a second aspect, implementations of the disclosure provide a communication apparatus. The apparatus includes processing unit. The processing unit is configured to determine a length of a header of a symbol, a length of a data portion of the symbol, and/or a length of a tail of the symbol.

In a third aspect, implementations of the disclosure provide a communication apparatus. The apparatus includes a processor, a memory, and a user interface. The processor, the memory, and the user interface are coupled with one another. The memory is configured to store computer programs. The computer programs include program instructions. The processor is configured to invoke the program instructions to perform the method for symbol application as described in the first aspect.

In a fourth aspect, implementations of the disclosure provide a computer-readable storage medium. The computer-readable storage medium stores one or more instructions. The one or more instructions are configured to be loaded and executed by a processor to perform the method for symbol application as described in the first aspect.

In implementations of the disclosure, the terminal device may determine the length of the header of the symbol, the length of the data portion of the symbol, and/or the length of the tail of the symbol. With this method, the method for symbol application can be optimized to be applicable to various scenarios.

What is claimed is:

1. A method for symbol application, performed by a terminal device, the method comprising:
receiving a signaling from an access network device; and
determining, according to the signaling received, any of:
a length of a header of a symbol and a length of a data portion of the symbol; or
the length of the data portion of the symbol and a length of a tail of the symbol; or
the length of the header of the symbol and the length of the tail of the symbol,
a waveform of the symbol being a variant of a discrete Fourier transform spreading orthogonal frequency division multiplexing (DFT-S-OFDM) waveform.

2. The method of claim 1, wherein the symbol has a unique word (UW) DFT-S-OFDM waveform or a zero tail (ZT) DFT-S-OFDM waveform.

3. The method of claim 1, wherein the determining comprises:
determining the length of the header of the symbol, the length of the data portion of the symbol, and/or the length of the tail of the symbol according to a type of the symbol indicated in the signaling.

4. The method of claim 1, wherein the determining comprises:
determining the length of the header of the symbol, the length of the data portion of the symbol, and/or the length of the tail of the symbol according to a predefined length set, wherein one element in the predefined length set indicates the length of the header of the symbol, the length of the data portion of the symbol, and/or the length of the tail of the symbol.

5. The method of claim 4, wherein the predefined length set is a predefined length table, and one row or one column in the predefined length table indicates the length of the header of the symbol, the length of the data portion of the symbol, and/or the length of the tail of the symbol.

6. The method of claim 4, wherein the predefined length set is configured by a radio resource control (RRC) signaling.

7. The method of claim 1, wherein the signaling is contained in an RRC signaling.

8. The method of claim 1, wherein the signaling is contained in a medium access control (MAC) signaling, a MAC packet data unit (PDU), or a MAC control element (CE).

9. The method of claim 1, wherein the signaling is contained in a physical downlink control channel (PDCCH), downlink control information (DCI), or a slot format indicator (SFI).

10. The method of claim 1, wherein
the determining comprises: determining a manner of obtaining the length of the header of the symbol, the length of the data portion of the symbol, and/or the length of the tail of the symbol according to a type of the symbol indicated in the signaling, and
lengths of symbols of different types are determined in different manners.

11. The method of claim 10, wherein the length of the header of the symbol of a first type, the length of the data portion of the symbol of the first type, and/or the length of the tail of the symbol of the first type are predefined.

12. The method of claim 10, wherein the length of the header of the symbol of a second type, the length of the data portion of the symbol of the second type, and/or the length of the tail of the symbol of the second type are obtained from an RRC signaling.

13. The method of claim 10, wherein the length of the header of the symbol of a third type, the length of the data portion of the symbol of the third type, and/or the length of the tail of the symbol of the third type are obtained from a MAC signaling, a MAC PDU, or a MAC CE.

14. The method of claim 10, wherein the length of the header of the symbol of a fourth type, the length of the data portion of the symbol of the fourth type, and/or the length of the tail of the symbol of the fourth type are obtained from a PDCCH, a DCI, or an SFI.

15. A communication apparatus, comprising:
a processor;
a memory; and
a user interface, wherein the processor, the memory, and the user interface are coupled with one another, the memory is configured to store computer programs, the computer programs comprise program instructions, and the processor is configured to execute the program instructions to:
 receive, through the user interface, a signaling from an access network device; and
 determine, according to the signaling received, any of:
  a length of a header of a symbol and a length of a data portion of the symbol; or
  the length of the data portion of the symbol and a length of a tail of the symbol; or
  the length of the header of the symbol and the length of the tail of the symbol,
 a waveform of the symbol being a variant of a discrete Fourier transform spreading orthogonal frequency division multiplexing (DFT-S-OFDM) waveform.

16. The communication apparatus of claim 15, wherein the symbol has a unique word (UW) DFT-S-OFDM waveform or a zero tail (ZT) DFT-S-OFDM waveform.

17. The communication apparatus of claim 15, wherein the processor is configured to execute the program instructions to:
 determine the length of the header of the symbol, the length of the data portion of the symbol, and/or the length of the tail of the symbol according to a predefined length set, wherein one element in the predefined length set indicates the length of the header of the symbol, the length of the data portion of the symbol, and/or the length of the tail of the symbol.

18. The communication apparatus of claim 15, wherein the processor is configured to execute the program instructions to: determine a manner of obtaining the length of the header of the symbol, the length of the data portion of the symbol, and/or the length of the tail of the symbol according to a type of the symbol indicated in the signaling, and
 lengths of symbols of different types are determined in different manners.

19. The communication apparatus of claim 15, wherein the processor is configured to execute the program instructions to:
 determine the length of the header of the symbol, the length of the data portion of the symbol, and/or the length of the tail of the symbol according to a type of the symbol indicated in the signaling.

20. A non-transitory computer-readable storage medium storing one or more instructions, the one or more instructions being configured to be loaded and executed by a processor to:
 receive a signaling from an access network device; and
 determine, according to the signaling received, any of:
  a length of a header of a symbol and a length of a data portion of the symbol; or
  the length of the data portion of the symbol and a length of a tail of the symbol; or
  the length of the header of the symbol and the length of the tail of the symbol,
 a waveform of the symbol being a variant of a discrete Fourier transform spreading orthogonal frequency division multiplexing (DFT-S-OFDM) waveform.

* * * * *